United States Patent
Trejo Jimenez

(10) Patent No.: US 11,555,579 B2
(45) Date of Patent: Jan. 17, 2023

(54) WHEELEND ASSEMBLY GREASE TOOL

(71) Applicant: STEMCO PRODUCTS, INC., Charlotte, NC (US)

(72) Inventor: Daniel Trejo Jimenez, Diana, TX (US)

(73) Assignee: Stemco Products, Inc., Charlotte, NC (US)

(*) Notice: Subject to any disclaimer, the term of this patent is extended or adjusted under 35 U.S.C. 154(b) by 216 days.

(21) Appl. No.: 17/030,153

(22) Filed: Sep. 23, 2020

(65) Prior Publication Data
US 2021/0088182 A1 Mar. 25, 2021

Related U.S. Application Data

(60) Provisional application No. 62/904,810, filed on Sep. 24, 2019.

(51) Int. Cl.
*F16N 37/00* (2006.01)
*F16C 33/66* (2006.01)

(52) U.S. Cl.
CPC ........ *F16N 37/003* (2013.01); *F16C 33/6622* (2013.01)

(58) Field of Classification Search
CPC .................................................. F16C 33/6622
See application file for complete search history.

(56) References Cited

U.S. PATENT DOCUMENTS

| | | | |
|---|---|---|---|
| 2,911,068 A * | 11/1959 | Wright | F16N 37/003 184/5.1 |
| 4,293,056 A * | 10/1981 | Setree, II | F16C 33/6622 184/105.3 |
| 4,763,957 A | 8/1988 | Poehlmann et al. | |
| 5,080,198 A * | 1/1992 | Rice | B60B 27/001 184/105.3 |
| 5,259,676 A | 11/1993 | Marti | |
| 5,328,011 A * | 7/1994 | Brister | F16D 13/74 184/105.3 |
| 6,321,875 B1 * | 11/2001 | Mihalak | F16C 33/6622 184/5.1 |
| 10,670,184 B2 * | 6/2020 | Petit | F16N 21/02 |
| 10,976,006 B2 * | 4/2021 | Petit | F16N 37/003 |
| 2017/0268722 A1 * | 9/2017 | Smith | F16N 1/00 |
| 2017/0370412 A1 * | 12/2017 | Petit | F16C 33/6622 |
| 2020/0080687 A1 * | 3/2020 | Petit | F16N 37/003 |

OTHER PUBLICATIONS

International Searching Authority, International Search Report and Written Opinion, PCT Application PCT/US2020/052302, dated Feb. 19, 2021, 11 pages.

* cited by examiner

*Primary Examiner* — Michael R Månsen
*Assistant Examiner* — Mark K Buse
(74) *Attorney, Agent, or Firm* — Perkins Coie LLP

(57) ABSTRACT

A grease tool for a unitized wheelend assembly is provided. The grease tool may have a plug with a fluid conduit to place a lubrication source in fluid communication with an inner bearing and a cap with a fluid conduit to place the lubrication source in fluid communication with an outer bearing. The grease tool may include a cylindrical body having an inner bearing support and an outer bearing support. The cylindrical body has an inner rotor and disc and an outer rotor and disc where the inner rotor and the outer rotor cause the discs to move between an extended and retracted position.

9 Claims, 8 Drawing Sheets

SECTION A-A

SECTION C-C

SECTION B-B

SECTION D-D

WHEELEND ASSEMBLY GREASE TOOL

CROSS-REFERENCE TO RELATED PATENT APPLICATIONS

The present application claims priority to U.S. Provisional Patent Application Ser. No. 62/904,810, filed Sep. 24, 2019, the entirety of which is incorporated herein by reference as if set out in full.

BACKGROUND

A wheelend assembly typically includes a main body or hub defining a cavity that receives an axle, spindle, or the like. The main body houses an inboard bearing assembly, a spacer (optionally), and an outboard bearing assembly. The spacer generally acts to maintain the distance between the inboard bearing assembly and the outboard bearing assembly and may allow limited movement of both such that the bearing and the associated race/cup can properly seat. Conventionally, the wheelend assembly also includes a spindle nut, oil seal, and retainer located on the assembly.

The inboard bearing assembly is on the inboard side and is bounded by an oil seal. The oil seal secures the inboard side of the wheelend assembly to inhibit the inboard bearing, the spacer, etc. from moving further. An end cap or retainer is typically placed over the outboard bearing and coupled to the main body to inhibit the wheelend assembly from unloading to the outboard side of the main body.

Currently, the trend is to provide a unitized wheelend assembly. The unitized wheelend assembly is shipped fully assembled and generally ready to be installed on a vehicle spindle. While there are numerous benefits to providing a unitized wheelend assembly for installation, one drawback is that the inner and outer bearing assemblies are often dry, e.g., they are not packed with a lubricant such as grease.

To pack the inner and outer bearings with lubricant, the unitized wheelend assembly may be disassembled and packed with a lubricant. However, this defeats the purpose of providing a unitized wheelend assembly as the assembly of the wheelend is exacting, cumbersome, and difficult.

In some uses, the wheelend bearings are installed on the spindle dry. The cavity of the wheelend assembly is provided with lubricant in the normal course. The hope being that during operation the lubricant from the cavity will migrate to the inner and outer bearings. However, this is a less than desirable solution as the level of lubrication to the bearings is unknown and lubrication in wheelends is generally viscous and of limited flowability.

Thus, against the above background, a tool to allow for packing lubrication into the inner and outer bearings of a wheelend assembly is desirable.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, a grease system for providing lubrication to an inner bearing and an outer bearing of a unitized wheelend assembly is provided. The grease system has an inner grease tool and an outer grease tool. The inner grease tool includes a plug having a sidewall shaped to engage the unitized wheelend assembly. The plug includes a fluid conduit formed in the plug where the fluid conduit includes an inlet configured to place the lubrication source in fluid communication with the fluid conduit and an outlet, formed in the sidewall of the plug, in fluid communication with the fluid conduit such that lubrication can be delivered from a lubrication source to the inner bearing. The outer grease tool comprises a cap configured to couple with a retainer of the unitized wheelend assembly. The cap includes a fluid conduit. The outer grease tool comprises an inlet and an outlet, where the outlet is proximal the outer bearing, to place the lubrication source in fluid communication with the outer bearing of the unitized wheelend assembly. In some aspects, the cap comprises a cover portion coupled to a base portion.

In some embodiments, the inner grease tool and the outer grease tool are coupled by a cylindrical body. In other embodiments, the inner grease tool and the outer grease tool are separate tools that may function together.

In some aspects of the technology, a grease system for providing lubrication to an inner bearing and an outer bearing of a unitized wheelend assembly is provided. The grease system includes a body shaped to fit a spindle bore of a unitized wheelend assembly where the body has a proximal side configured to be proximal the inner bearing of the unitized wheelend assembly and a distal side opposite the proximal side and configured to be proximal the outer bearing of the unitized wheelend assembly. An inner rotor and an outer rotor are rotationally coupled to the body. The inner rotor is operationally coupled to an extendable and retractable inner disc. The outer rotor is operationally coupled to an extendable and retractable outer disc. Rotation of the inner/outer rotor moves the extendable and retractable inner/outer disc between the extended and retracted position. A plurality of fluid conduits extending through the body are configured to deliver lubricant to a chamber adjacent to the inner bearing and the outer bearing when the inner rotor and the outer rotor are in the extended position.

In some embodiments, the body is coupled to a lever that causes rotation of the inner/outer rotor.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to a unitized wheel assembly for a heavy-duty vehicle. However, the technology described herein may be used with applications other than those specifically described herein. For example, the technology of the present application may be applicable to other vehicle wheelends, non-unitized wheelend, or the like. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1A:
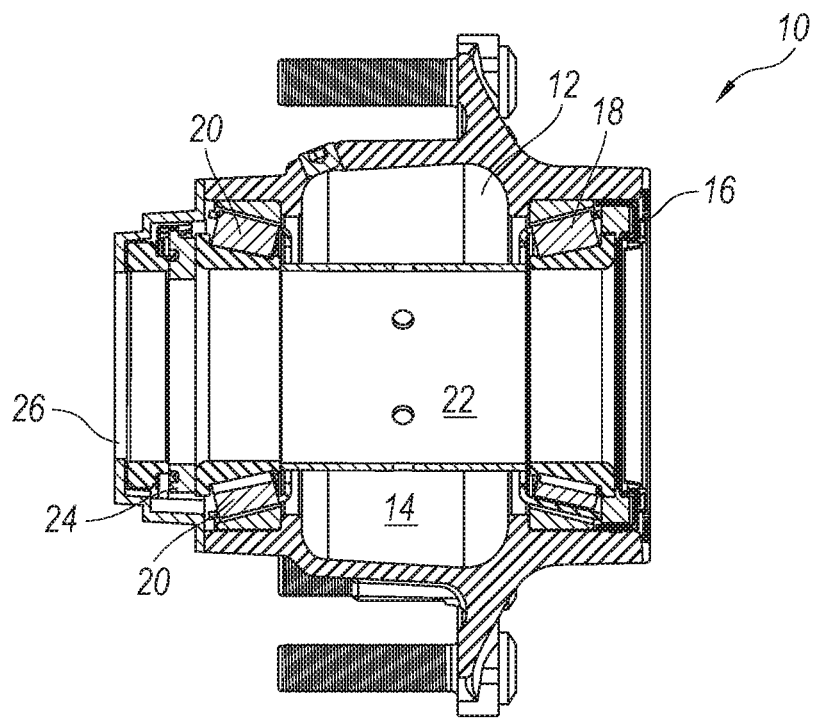
FIGS. 1a and 1b are cross sectional views of wheelend assemblies for which the technology of the present application is usable.
Figure 1B:
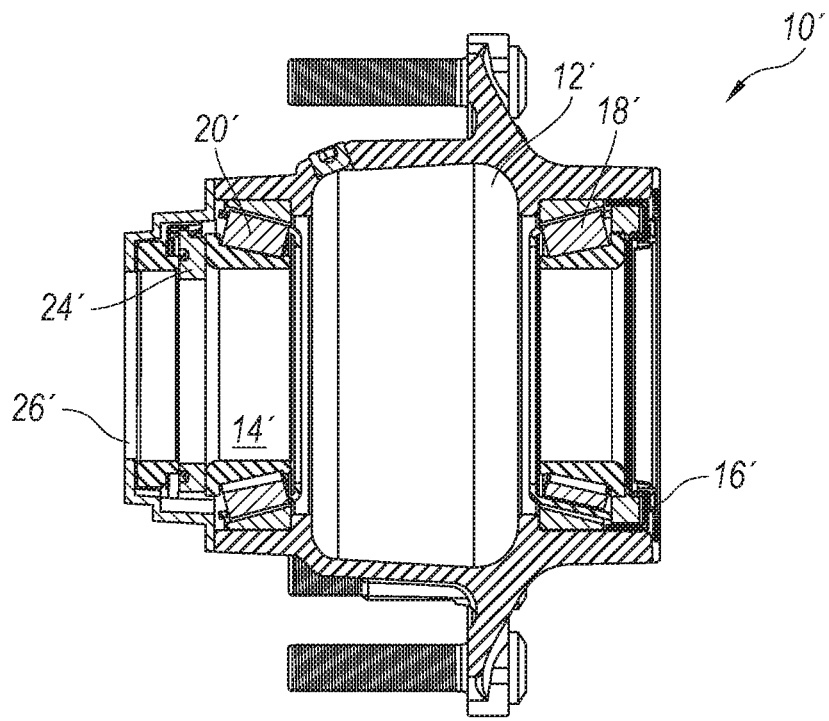

With reference now to FIGS. 1a and 1b, a cross sectional view of unitized wheelend assemblies 10 and 10' are provided. The unitized wheelend assembly 10 includes a hub 12 (or main body 12) defining, among other things a cavity 14, an inboard oil seal 16, and inboard bearing assembly 18, which comprises a bearing race and cup, an outboard bearing assembly 20, which also comprises a bearing race and cup, a spacer 22 residing between the inboard bearing assembly 18 and 20 and a unitized nut assembly 24, which generally comprises the necessary components to fix the unitized wheelend assembly on the vehicle spindle. A retainer 26 is provided over the unitized nut assembly 24.

The unitized wheelend assembly 10' is similar to the unitized wheelend assembly 10, but does not include the spacer. The unitized wheelend assembly 10' includes a hub 12' (or main body 12') defining, among other things a cavity 14', an inboard oil seal 16', and inboard bearing assembly 18', which comprises a bearing race and cup, an outboard bearing assembly 20', which also comprises a bearing race and cup, and a unitized nut assembly 24'. A retainer 26' is provided over the unitized nut assembly 24'.

Figure 2:
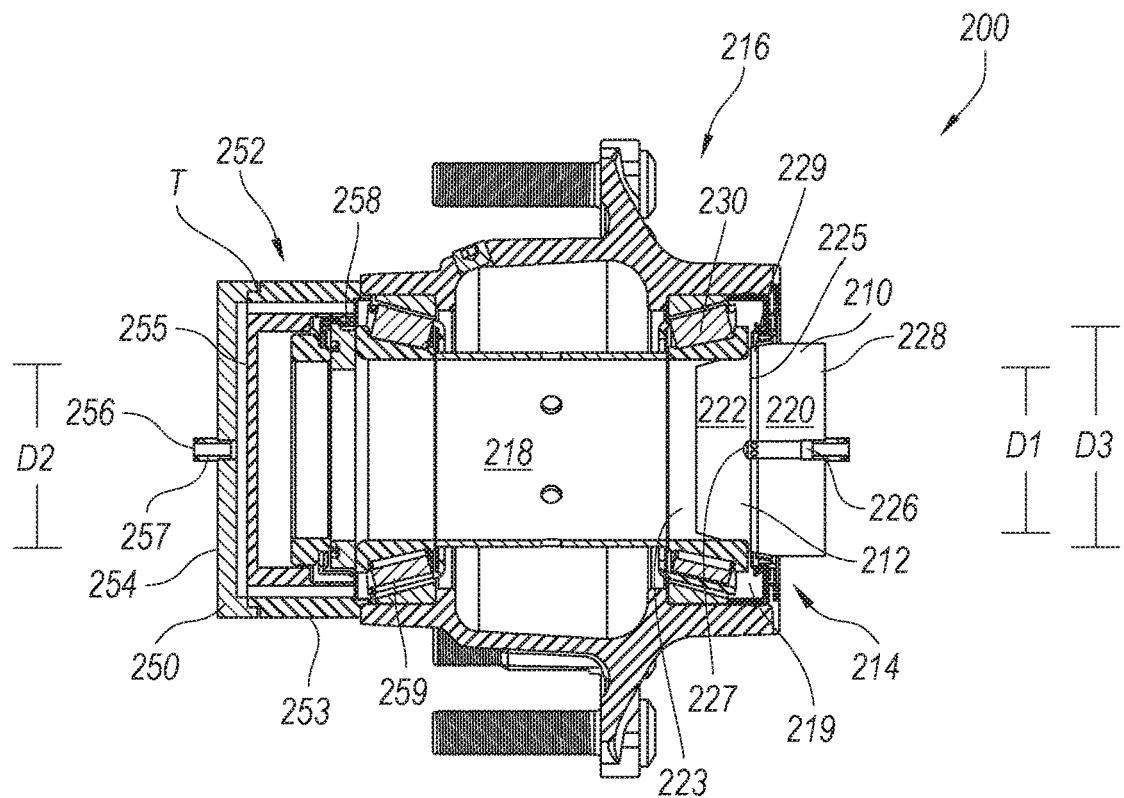
FIG. 2 is a cross sectional view of a grease system consistent with the technology of the present application.

With reference now to FIG. 2, a grease system 200 to allow packing the inner bearings and the outer bearings is provided. The grease system, as shown in FIG. 2, includes an inner grease tool 210 and an outer grease tool 250.

The inner grease tool 210 is generally a plug 212 that is sized to fit within a spindle bore 214 of the unitized wheelend assembly 216. Wheelend assembly 216 is shown with a spacer 218, such as a spacer associated with International Application PCT/US18/51434, titled Spacer to Enhance Lubrication for Wheelend Assembly, the disclosure of which is incorporated herein as if by reference. However, the spacer 218 is optional and the grease system 200 is functional when the wheelend assembly does not have a spacer. The plug 212 may comprise a cylindrical body 220 with a tapered end portion 222. The tapered end portion 222 has a first diameter D1 at a first terminal end 223 of the cylindrical body 220. First diameter D1 is less than the diameter D2 of the spindle bore. The cylindrical body has a second diameter D3 at the transition 224 between the tapered end portion 222 to the remainder of the plug 212. The second diameter D3 is larger than the spindle bore diameter D2 such that the plug 212 forms a taper lock with the seal inner diameter. Although the taper lock connection facilitates placement of the plug 212 in the seal inner diameter, the plug 212 may be held with a tool or by hand, while packing the bearing to ensure the plug does not disengage during operation.

The plug 212 is formed with an internal fluid channel 225. The fluid channel 225 has an inlet 226, which is shown generally at a central location 227 on a top surface 228 of the plug 212, and a plurality of outlets 229, which are shown generally located on a radial sidewall of the plug 212. The outlets 229 are located proximal the inner bearing 230 of the unitized wheelend assembly 216. As shown, the inlet 226 and the outlet are connected in a type of hub and spoke configuration. Although shown as a single inlet 226, the plug 212 may have a plurality of inlets 226 and, in certain embodiments, may have a number of inlets and outlets. The inlet 226 is configured with a fitting to receive a conduit or hose to place the inlet 226 in fluid communication with a lubrication source, such as grease, not specifically shown. While shown with a plurality of outlets 229 in a hub and spoke arrangement, the plug 212 may comprise a single outlet 229 in certain embodiments. The lubrication from the single outlet 229 would flow, under pressure from a grease gun or the like, from one bearing to the next until all the bearings are lubricated.

The outer grease tool 250 is generally a cap 252 that is sized to fit over the nut assembly 24 (or 24'). The cap 252 may be formed in a base portion 253 and a cover portion 254. The base portion 253 couples to the wheelend assembly 216 and the cover portion 254 couples to the base portion 253. Both couplings could be via a friction fit or a threaded connection. During use, the cap 252 may be held, either manually or with a tool, over the nut assembly 24 (or 24') to ensure the cap 252 does not disengage during operation.

The cap 252 is formed with an internal fluid conduit 255, which fluid conduit 255 may be formed by a gap formed between the base portion 253 and the cover portion 254 when the base portion 253 and cover portion 254 are coupled together. The base portion 253 and the cover portion 254 may couple using a threaded connection T. The fluid conduit 255, as shown, includes an inlet 256 located generally centrally on the cover portion 254 and has a fitting 257 to place a lubrication source, not specifically shown, in fluid communication with the fluid conduit 255. The cap 252 also is formed with a plurality of outlets 258 located proximal the outer bearings 259 of the unitized wheelend 216. While shown with a plurality of outlets 258 in a hub and spoke arrangement, the cap 252 may comprise a single outlet 258 in certain embodiments. The lubrication from the single outlet 258 would flow, under pressure from a grease gun or the like, from one bearing to the next until all the bearings are lubricated.

Figure 3:
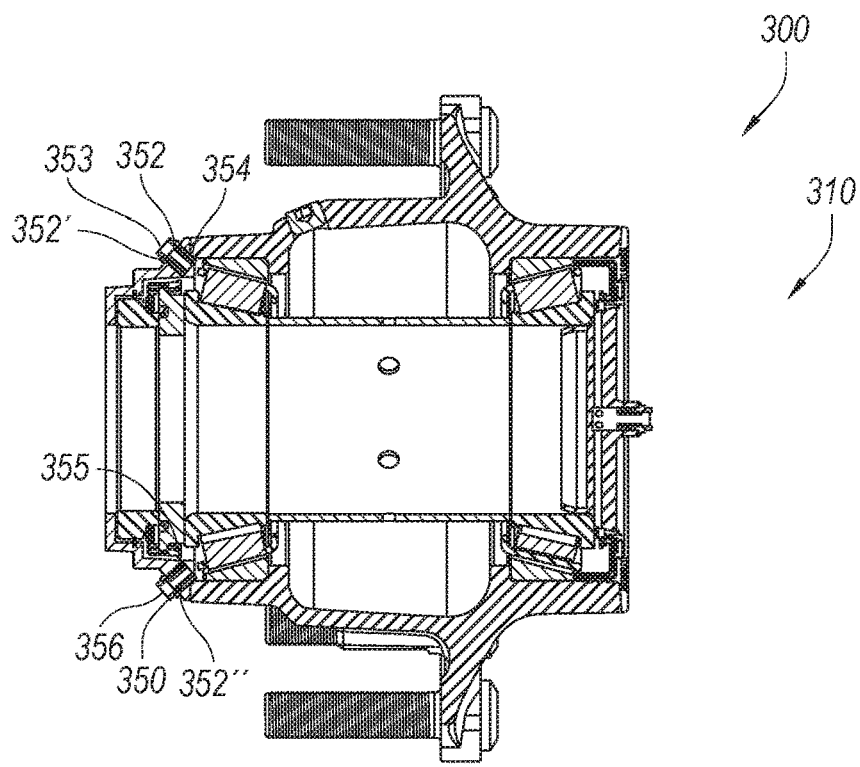
FIG. 3 is a cross sectional view of a grease system similar to FIG. 2 consistent with the technology of the present application.

FIG. 3 shows another grease system 300, which is similar to grease system 200 above. The grease system 300 includes an inner grease tool 310 and an outer grease tool 350. The inner grease 310 is similar to the inner grease tool 210 above, but with a significantly lower profile. The outer grease tool 350 is provided as a plurality of ports 352 arranged in the retainer 26 (or 26') of the unitized wheelend assembly 216. At least one of the ports, such as port 352', in this exemplary embodiment, has an inlet 353 fitting to place a lubrication source in fluid communication with the port 352'. The port 352' also comprises an outlet 354 proximal the outer bearing. The lubrication is moved, via a grease gun or the like, from the lubrication source to the inlet 353, through the port 352', and out the outlet 354 such that the lubrication flows to the outer bearings. A second port of the plurality of ports 352, such as port 352", may be configured as a vent having an intake 355 and an exhaust 356. In certain embodiments, the outer grease tool 350 may comprise a single port 352'.

Generally the tools shown in FIGS. 2 and 3 are used for field or aftermarket application of lubrication to the bearings of the unitized wheelend assembly 216. Operating of the grease systems 200 and 300 includes orienting the unitized wheelend assembly 216 to receive grease. For the inner bearing packing of grease, the plug 212 is pushed into the spindle bore (or bearing opening). As mentioned, the plug 212 may form a taper lock or may be held in place. The lubrication source is coupled to inlet 226 using an applicable fitting. The lubrication, such as grease or semi-fluid grease, is added to the bearings. The grease will travel between the seal 217 and the inner bearing 18 (or 18') to fill the chamber 219 formed between the inner bearing and the seal. As the lubrication from the lubrication source continues to flow into the chamber 219, the lubrication is pushed into the bearing rollers and out the opposite end. The lubrication also flows to successive bearings. Once the required lubrication is used, the tool is removed and the unitized wheelend assembly 216 is placed on a spindle in a conventional manner.

Once the inner bearing is packed, the unitized wheelend assembly 216 is placed on the spindle. The outer grease tool 250 is fitted over the retainer. The outer grease tool 300 may be formed as part of the retainer. Similar to the above, the outer grease tool is coupled to or held in place. The lubrication source is coupled to the inlet 257 (sometimes referred to as a fitting or port 352'). The lubrication is caused to flow from the lubrication source through the inlet, the fluid conduit, and the outlet to the outer bearing. Once the appropriate amount of lubrication is applied to the outer bearings, the outer grease tool is removed.

Subsequent to the above procedure, the inner bearings and outer bearings are packed with lubrication and the unitized wheelend assembly is ready to be coupled to the vehicle spindle. The unitized wheelend is ready for operation once lubrication is added to the cavity 14 (or 14') in the hub 12 (or 12').

Figure 4:
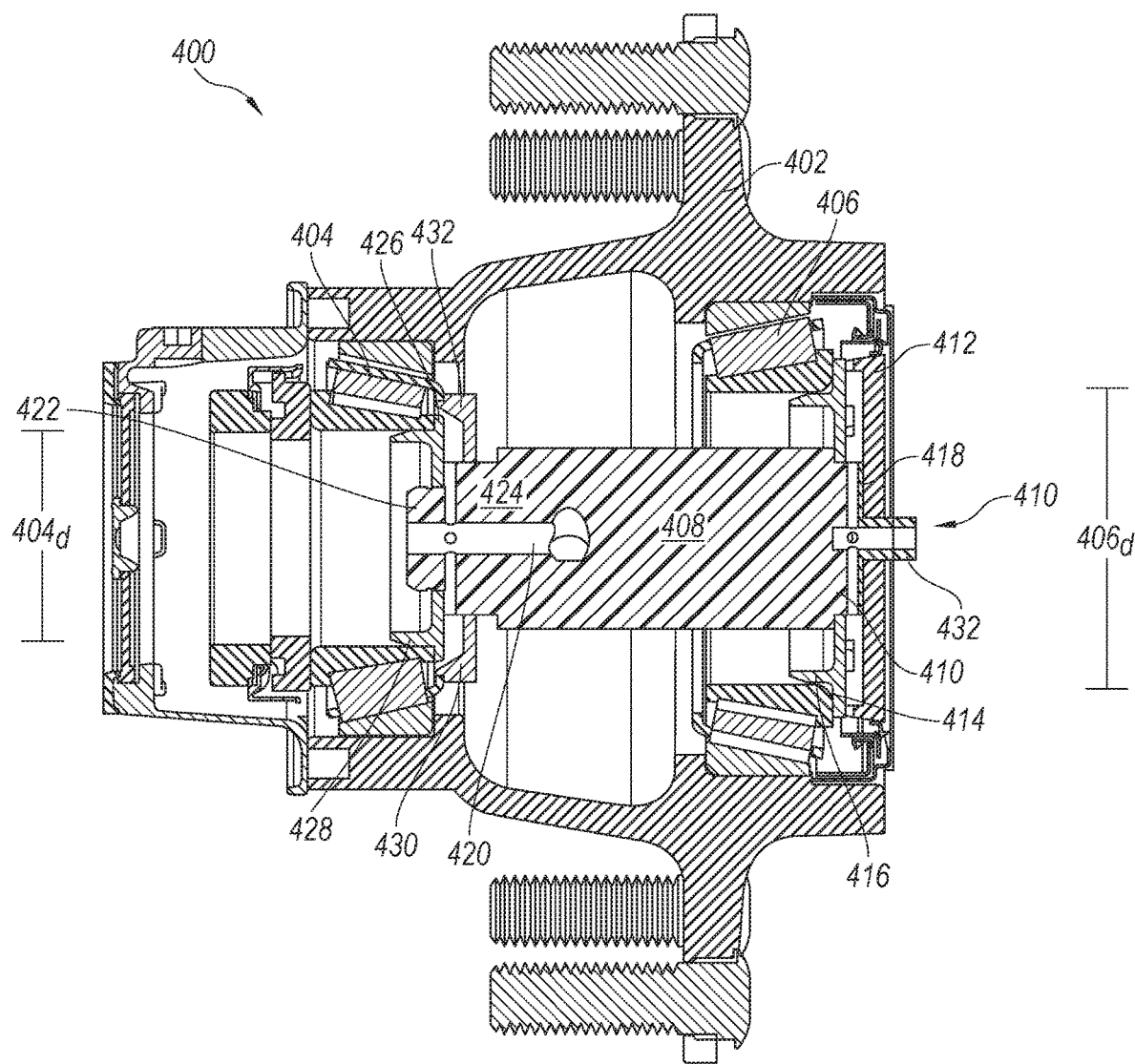
FIG. 4 is a cross sectional view of another embodiment of a grease system consistent with the technology of the present application.

FIG. 4 shows another grease system 400, which is similar in part to the grease systems above. The grease system 400 is shown for a wheelend assembly 402 having an outer bearing 404 with a diameter 404d that is smaller than the inner bearing 406 diameter 406d. The smaller outer bearing diameter 404d allows a cylindrical body 408 to be inserted through the spindle bore 410 of the wheelend assembly 402. The cylindrical body 408 is coupled at a proximal end 410 to an outer plug 412. The outer plug 412 is sized to fit in the wheelend 402 and may include a flanged surface 414 and annular tang 416 to form a sealing engagement with the wheelend 402. The outer plug 412 has an inner bearing fluid channel 418 and an outer bearing fluid channel 420. The distal end 422 of the cylindrical body 408 includes an inner plug 424. The inner plug 424 has a flanged surface 426 with an annular tang 428 to form a sealing engagement with the wheelend 402. The distal end 422 of the cylindrical body 408 also includes an inner dam 430 that has an annular rim 432 that forms a sealing engagement with the outer bearing 404. The flanged surface 426 and the inner dam 430 may be flexible members to allow them to bend such that they can be inserted into the cavity of the wheelend, but also sufficiently rigid such that when lubricant flows in the outer bearing fluid channel 420, the flanged surface 426 and the inner dam 430 contain the lubricant such that it packs the outer bearing 404. The inner bearing fluid channel 418 and the outer bearing fluid channel 420 each have a fitting 432 to couple the fluid channels to the lubricant source, not specifically shown.

Figure 5:
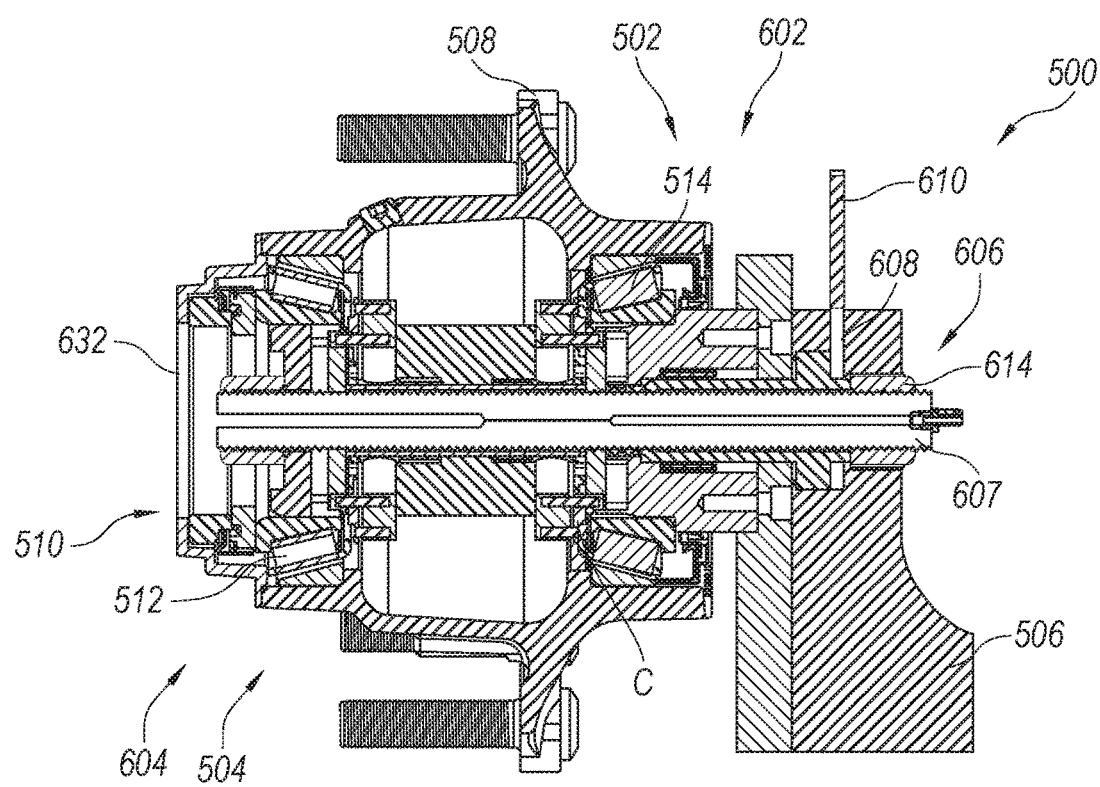
FIG. 5 is a cross sectional view of another embodiment of a grease system consistent with the technology of the present application.
Figure 6:
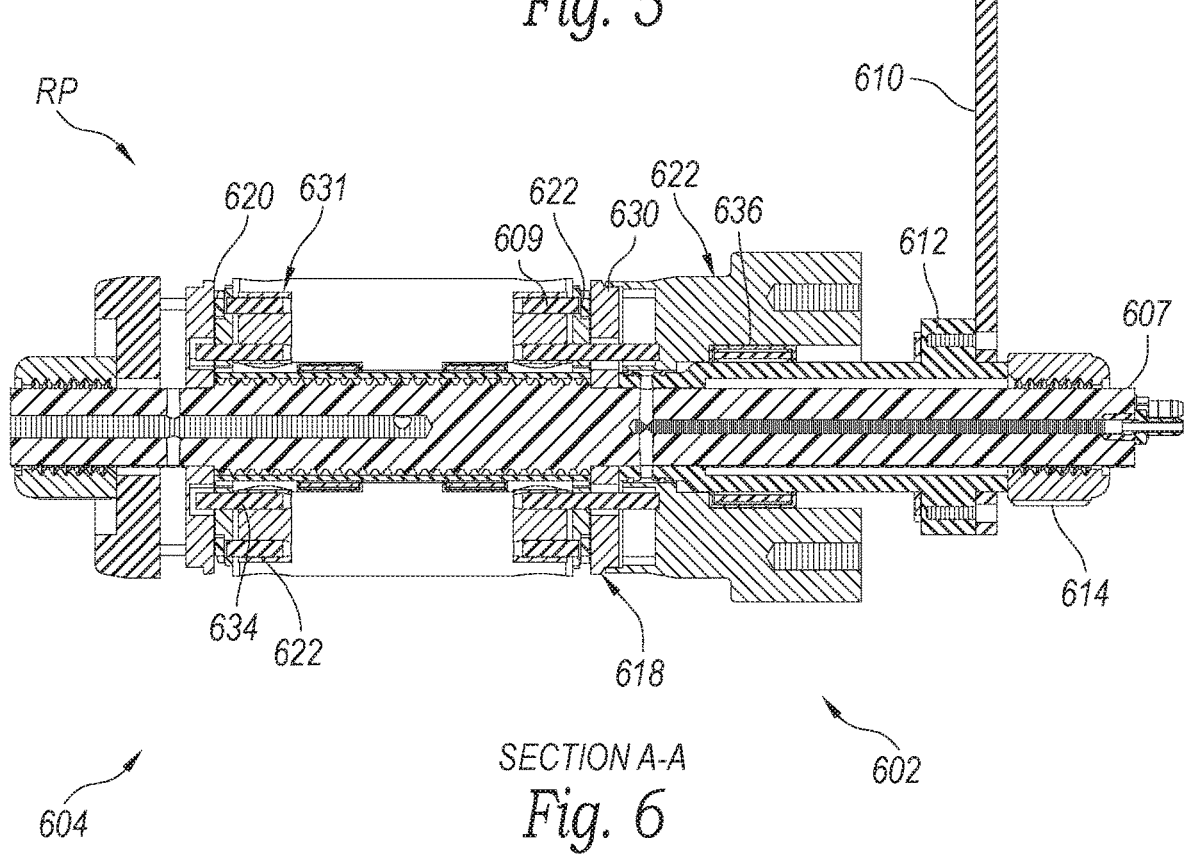
FIG. 6 is a cross sectional view of the grease system of FIG. 5 in a retracted (or installation) state.
Figure 7:
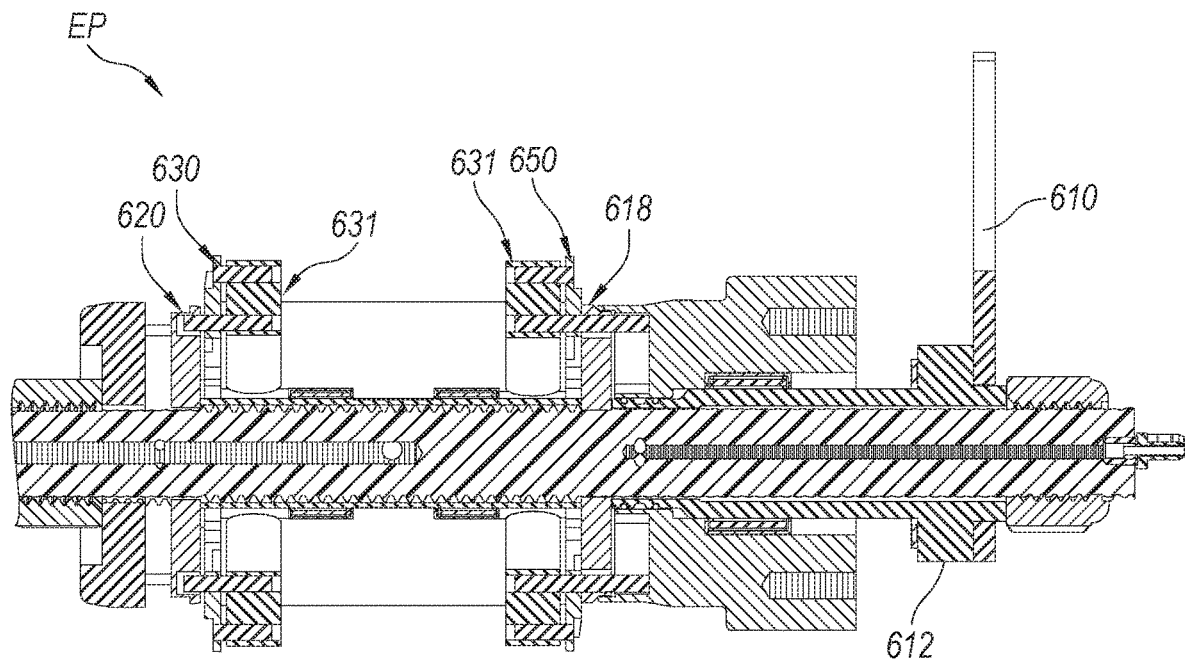
FIG. 7 is a cross sectional view of the grease system of FIG. 5 in an extended (or lubrication delivery) state.

FIG. 5 shows an internal grease system 500 that has an inner grease tool part 502 and an outer grease tool part 504. Generally, the internal grease system 500 would be used with a stand 506 to which a wheelend assembly 508 is removably coupled, such as by a fitting, clamps, or the like. FIGS. 6 and 7 show the internal grease system 500 removed from the wheelend assembly 508 for simplicity. FIG. 6 shows the internal grease system 500 configured to be inserted through the spindle bore 510 (retracted position RP) and FIG. 7 shows the internal grease system 500 configured to dispense lubricant to the outer bearing 512 and the inner bearing 514 (extended position EP).

With reference to FIGS. 5 and 6, the internal grease system 500 will be explained in more detail. The internal grease system 500 has a proximal side 602 (which may be referred to as the inner grease tool part 502) and a distal side 604 (which may be referred to as the outer grease tool part 504). The stand 506 has a bore 606 (FIG. 5) through which a shaft 607 of the internal grease system 500 extends. The stand 506, as can be appreciated, may function as the plugs described above. The shaft 607 extends from the proximal side 602 to the distal side 604, which shaft 607 includes the fluid channels and conduits similar to the fluid channels and conduits explained above. The bore 606 receives a nut 614 that receives the shaft 607 of the internal grease system 500.

Figure 8:
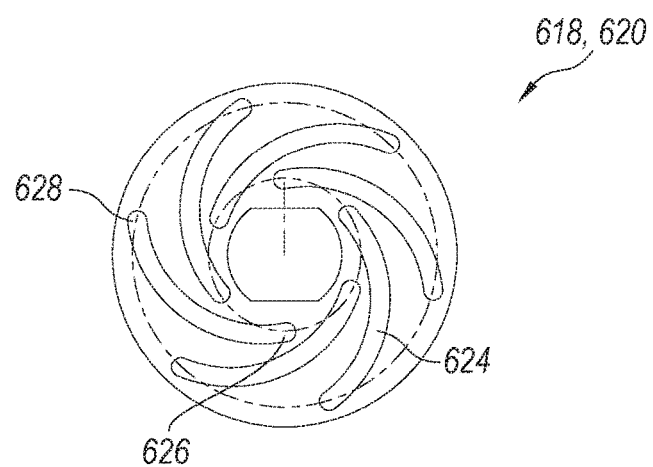
FIG. 8 is a plan view of a rotor of the grease system of FIG. 5.
Figure 9:
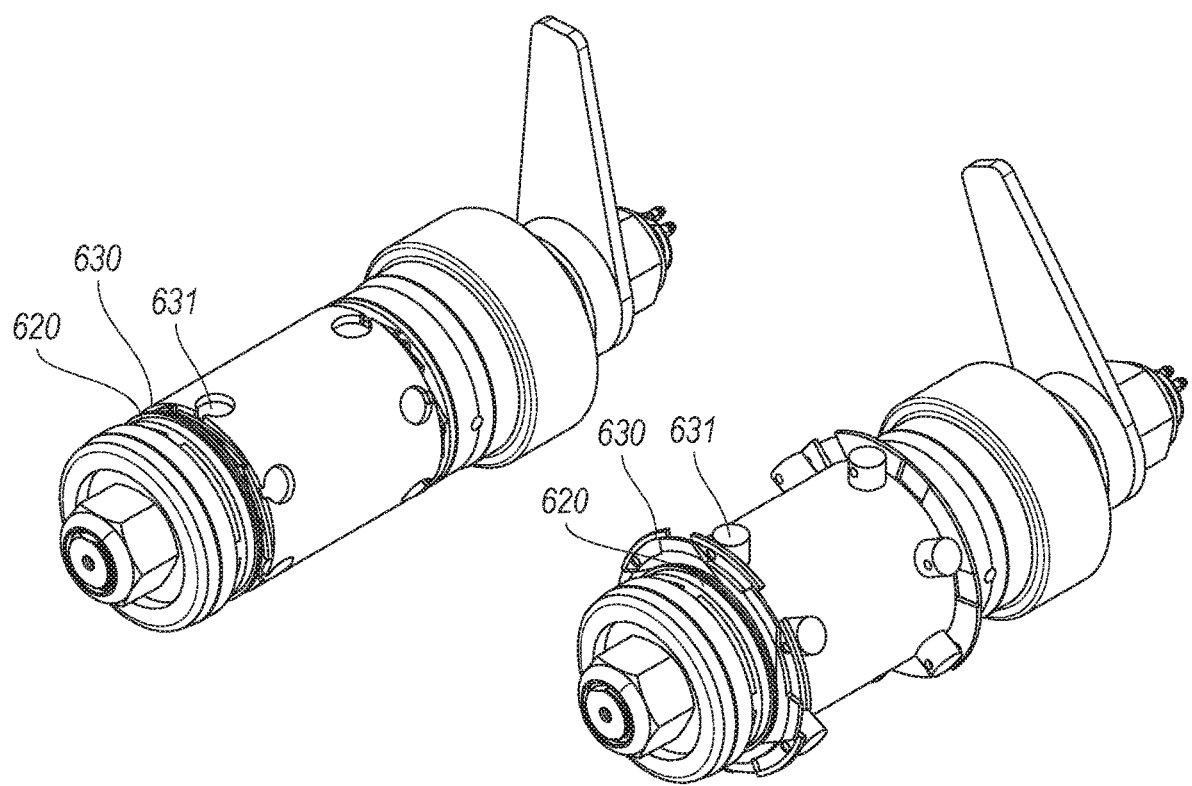
FIG. 9 is a perspective view of the grease system of FIG. 5 in the retracted state and the extended state.

The stand 506 has a slot 608 (FIG. 5), which receives a lever 610, explained further below. The lever 610 coupled to an adapter 612 (or sleeve 612) that is rotationally coupled to the shaft 607. The adapter 612 is rotationally coupled to the internal grease system 500 using bearings 609, such as the shown needle bearings. The lever 610 is rotatable in the slot 608. The adapter 612 rotates in the internal grease system 500 with the lever 610. The adapter 612 is coupled to an inner rotor 618 and an outer rotor 620 (see FIG. 8). Rotation of the adapter 612 causes the inner and outer rotors 618, 620 to rotate. During rotation of the rotors 618, 620, a plurality of pins 622 move in travel guides 624 (FIG. 8) from an inner position 626 to an outer position 628. The travel of the pins 622 in the travel guides 624 cause the slide 631 to move from a retracted position (see FIG. 6) to an extended position (see FIG. 7). The movement of the slide 631 causes the disc 630 (or fins 630) to extend from the internal grease system 500 cylindrical body to form a dam. As seen in FIG. 5, when extended, the disc 630 form a flow path from the fluid channels and conduits to the inner and outer bearings. FIG. 9 shows a perspective view of the slides 631 and discs 630 in both the retracted and extended position.

The internal grease system 500 extends from the inboard side of the wheelend to the outboard side of the wheelend and is coupled to an inboard nut 614 and an outboard nut 632. The internal grease system 500 does not extend beyond the retainer and spindle nut. The internal grease system 500, which is a generally cylindrical body, has an outer bearing support 634, which, in this exemplary embodiment, is an annular protrusion and flanged surface, on the distal side 604. The outer bearing support 604 is internal, too, and abutting the outer bearing. The internal grease system 500 also includes an inner bearing support 636 on the proximal side 602. The inner bearing support 636, in this exemplary embodiment, may be an annular surface on the cylindrical body.

Figure 10:
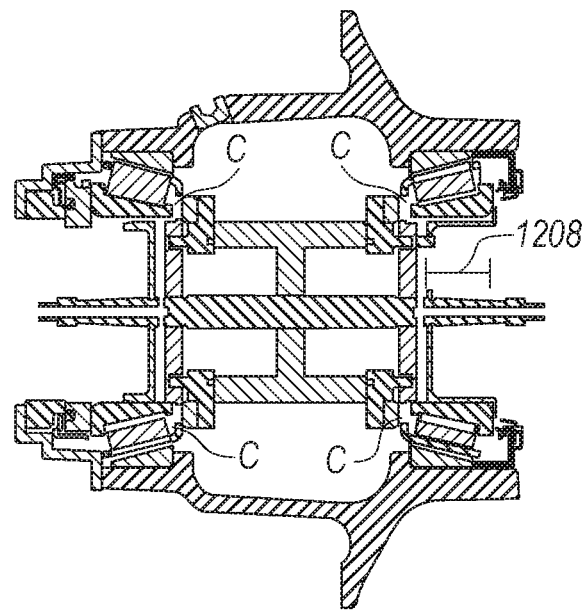
FIG. 10 is a cross sectional view of the grease system of FIG. 5 with portions removed to better show the chambers.

The flow of the lubricant, for both the inner and outer bearings in this example, is along the disc 630 to a chamber C formed by the disc 630 and the inner and outer bearings. FIG. 10 shows a version of the internal grease system 500 with other parts not shown or not labeled such that the chamber C is more easily seen. The lubricant is forced from the hub side of the wheelend assembly into the bearings. During operation, the wheelend assembly is slid onto the cylindrical body of the grease tool system and arranged horizontally (similar to how it is deployed on a vehicle). With the wheelend deployed on the internal grease system, the lever is rotated to rotate the rotors and cause the dams to move from the retracted to the extended position. The lubrication source is placed in fluid communication with both the inner and outer fluid channels and conduits. Once the amount of lubricant is delivered, the lever or counter rotate to retract the dams to the retracted position. The wheelend is removed from the tool and installed on the vehicle spindle in a conventional manner with packed bearings. As can be appreciated, the grease tool 650, shown in FIG. 10, is a slightly different configuration to place the outer bearing in fluid communication with the lubrication source. In FIG. 10, the flow configuration provides the fluid conduit from the retainer side of the unitized wheelend assembly instead of the oil seal end.

Figure 11:
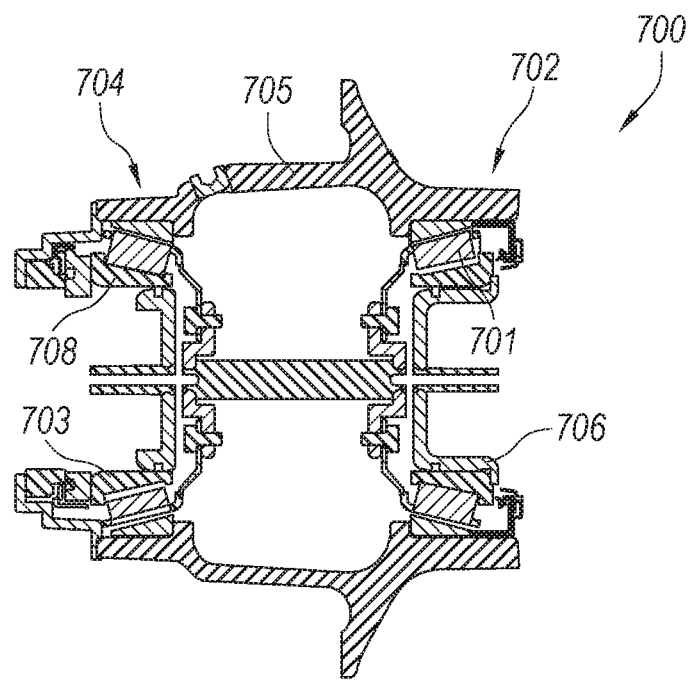
FIG. 11 is a cross sectional view of another embodiment of a grease system consistent with the technology of the present application
Figure 12:
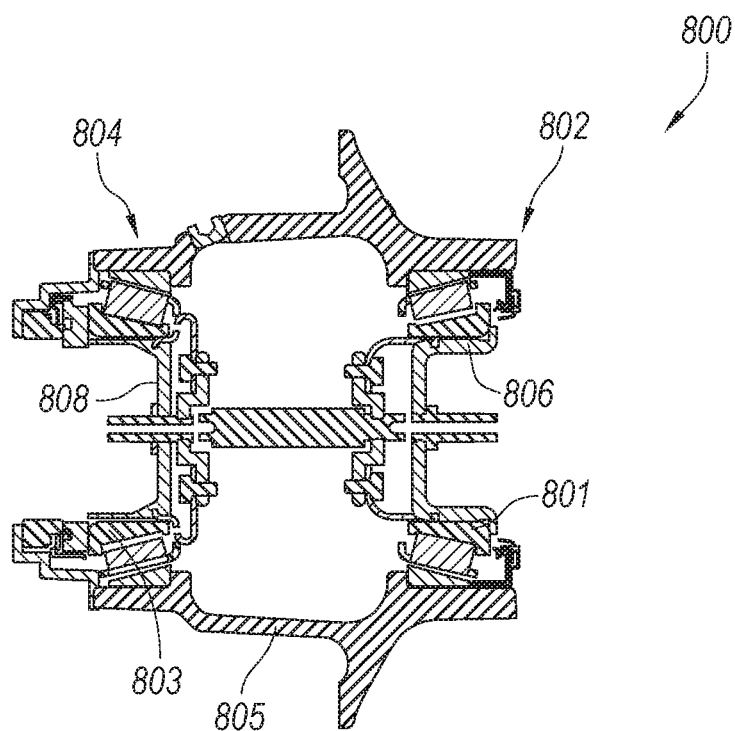
FIG. 12 is a cross sectional view of another embodiment of a grease system consistent with the technology of the present application.
Figure 13:
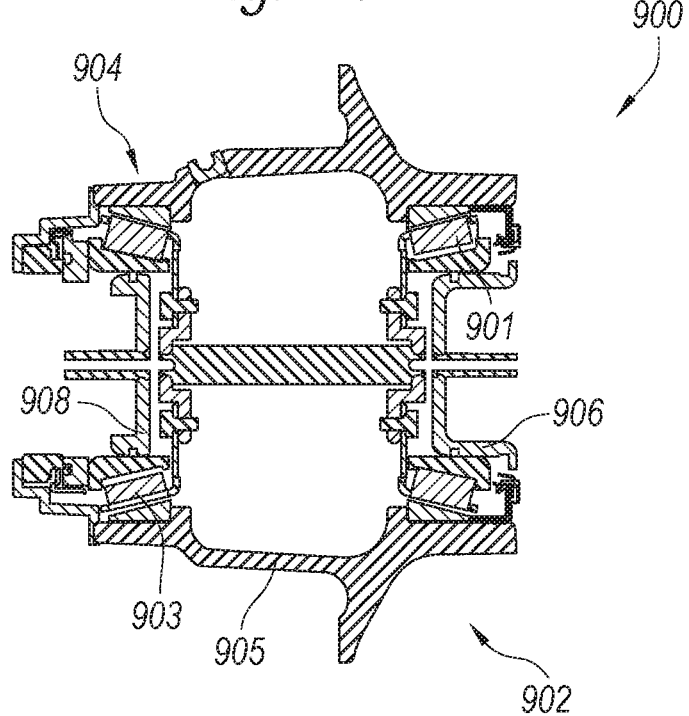
FIG. 13 is a cross sectional view of another embodiment of a grease system consistent with the technology of the present application.

FIG. 11-13 shows alternative internal grease systems 700, 800, and 900. The internal grease system 700, 800, 900 includes an inner bearing tool portion 702, 802, 902 and an outer bearing tool portion 704, 804, 904, both of which are designed to engage the inner and outer bearings 701/703, 801/803, 901/903 of the wheelend assembly 705, 805, 905. The internal grease systems 700, 800, 900 include an inner bearing support 706, 806, 906 which is an annular surface on the inner bearing tool portion 702, 802, 902 of the cylindrical body of the internal grease system 700, 800, 900 and an outer bearing support 708, 808, 908, which is a protrusion and flanged surface on outer bearing tool portions 704, 804, 904. Unlike the slides 631 that move from a retracted position to an extended position based on rotation, the internal grease systems 700, 800, 900 include elastic members that are elastically deformed and folded about the cylindrical body of the internal grease systems. The elastic members return to a deployed position to form a seal with the inner and outer bearing.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. An apparatus configured to allow packing at least one bearing of a unitized wheelend assembly with a lubricant, comprising:
    an inner grease tool, the inner grease tool comprising;
        a plug, the plug having a sidewall shaped to engage the unitized wheelend assembly;
        at least a first fluid conduit formed in the plug, the first fluid conduit comprising:
            an inlet with a fitting configured to place a lubrication source in fluid communication with the first fluid conduit formed in the plug, and
            an outlet formed in the sidewall of the plug configured to be proximal the at least one bearing, wherein the outlet is configured to form a chamber with the at least one bearing such that outlet is configured to be in fluid communication with the at least one bearing through the chamber, such that lubricant for the at least one bearing can flow from the lubrication source through the inlet, the first fluid conduit, the outlet, and the chamber to the at least one bearing until the at least one bearing is packed with lubricant; and
    an outer grease tool, the outer grease tool comprising:
        a cap that includes a base portion and a cover portion, wherein the base portion is fitted over to a nut assembly of the unitized wheelend assembly and the cover portion is coupled to the base portion wherein a second fluid conduit is formed between the base portion and the cover portion and wherein the cap comprises an inlet and at least one outlet in fluid communication via the second fluid conduit such that lubricant for can flow from the lubrication source through the inlet, the second fluid conduit, and the outlet to at least a second bearing of the unitized wheelend assembly.

2. The apparatus of claim 1 wherein the at least one lubricant is grease.

3. The apparatus of claim 2 wherein the grease is semi-fluid grease.

4. The apparatus of claim 1 wherein the outer grease tool comprises at least a first port wherein the first port is coupled to the retainer of the unitized wheelend assembly and has an inlet and an outlet opposite the inlet configured to place the lubrication source in fluid communication with the second bearing.

5. The apparatus of claim 4 wherein the outer grease tool comprises at least a second port wherein the second port comprises a vent including an exhaust and an intake opposite the exhaust.

6. The apparatus of claim 1 wherein the outer grease tool is coupled to the inner grease tool via a cylindrical body wherein the inner grease tool comprises an inner bearing support and the outer grease tool comprises an outer bearing support.

7. An apparatus configured to allow simultaneously packing an inner bearing and an outer bearing of a unitized wheelend assembly with a lubricant, comprising:
- a body shaped to fit in a spindle bore of a unitized wheelend assembly where the body has a proximal side configured to be proximal the inner bearing of the unitized wheelend assembly and a distal side opposite the proximal side and configured to be proximal the outer bearing of the unitized wheelend assembly;
- an inner rotor rotationally coupled to the body on the proximal side;
- an outer rotor rotationally coupled to the body on the distal side;
- an extendable and retractable inner disc coupled to the body on the proximal side and operationally coupled to the inner rotor wherein rotation of the inner rotor causes the inner disc to move between an extended position and a retracted position;
- an extendable and retractable outer disc coupled to the body on the distal side and operationally coupled to the outer rotor wherein rotation of the outer rotor causes the outer disc to move between an extended position and a retracted position;
- a plurality of fluid conduits extending through the body and configured to deliver lubricant to a chamber adjacent to the inner bearing and the outer bearing when the inner rotor and the outer rotor are in the extended position.

8. The apparatus of claim 7 comprising a lever operationally coupled to the inner rotor and the outer rotor to cause the inner rotor and outer rotor to rotate.

9. The apparatus of claim 8 comprising an adapter rotationally coupled to the body, operationally coupled to the inner rotor and the outer rotor, and coupled to the lever where movement of the lever causes the adapter to rotate, which rotation causes the inner rotor and the outer rotor to rotate.

* * * * *